United States Patent
Klinstein et al.

(10) Patent No.: US 9,688,017 B2
(45) Date of Patent: Jun. 27, 2017

(54) VIBRATION WELDERS WITH HIGH FREQUENCY VIBRATION, POSITION MOTION CONTROL, AND DELAYED WELD MOTION

(71) Applicant: Dukane Corporation, St. Charles, IL (US)

(72) Inventors: Leo Klinstein, Glenview, IL (US); Paul Golko, Crystal Lake, IL (US); William E. Jurkowski, Wheaton, IL (US); Raymond M. LaFlamme, White Lake, MI (US)

(73) Assignee: Dukan IAS, LLC, St. Charles, IL (US)

( * ) Notice: Subject to any disclaimer, the term of this patent is extended or adjusted under 35 U.S.C. 154(b) by 0 days.

(21) Appl. No.: 14/277,249

(22) Filed: May 14, 2014

(65) Prior Publication Data

US 2014/0338814 A1    Nov. 20, 2014

Related U.S. Application Data

(60) Provisional application No. 61/974,246, filed on Apr. 2, 2014, provisional application No. 61/823,101, filed on May 14, 2013.

(51) Int. Cl.
*B32B 41/00* (2006.01)
*B29C 65/06* (2006.01)
*B29C 65/00* (2006.01)

(52) U.S. Cl.
CPC ...... *B29C 65/0618* (2013.01); *B29C 66/0242* (2013.01); *B29C 66/8322* (2013.01);
(Continued)

(58) Field of Classification Search
CPC .......... B29C 65/0618; B29C 66/93441; B29C 66/8322; B29C 66/9221; B29C 66/9516;
(Continued)

(56) References Cited

U.S. PATENT DOCUMENTS

| 4,179,059 A | 12/1979 | Chang et al. | 228/103 |
| 4,333,791 A | 6/1982 | Onishi | 156/580 |

(Continued)

FOREIGN PATENT DOCUMENTS

| DE | 4001367 A1 | 9/1991 |
| DE | 4120245 | 1/1992 |

(Continued)

OTHER PUBLICATIONS

PCT International Search Report for International Application No. PCT/US2007/011011 dated Feb. 28, 2008, 5 pages.
(Continued)

*Primary Examiner* — Michael N Orlando
*Assistant Examiner* — Joshel Rivera
(74) *Attorney, Agent, or Firm* — Nixon Peabody LLP

(57) ABSTRACT

A vibration welding system and method having an operating vibration frequency of 260 Hz or higher. A pressing action between two workpieces is effected by directly controlling, with a control system and a sensor, the relative positions of the workpieces during some or all of the weld cycle, or by controlling the speed between the workpieces during some phase of the weld cycle and controlling the force between the workpieces during other phases. An external control device can be coupled to a control system, to produce an input signal to adjust the speed of relative motion between the workpieces, the force therebetween, or both speed and force based on the input signal. A positive force can be initially applied between the workpieces, and the weld is started by initiating lateral vibrations while the relative position between the workpieces in the pressing direction is maintained, a control variable is monitored, and the second workpiece is moved relative to the first only after the monitored variable satisfies a condition.

19 Claims, 7 Drawing Sheets

(52) U.S. Cl.
CPC .... *B29C 66/9221* (2013.01); *B29C 66/92445*
(2013.01); *B29C 66/93441* (2013.01); *B29C*
*66/9511* (2013.01); *B29C 66/9515* (2013.01);
*B29C 66/9516* (2013.01); *B29C 66/8242*
(2013.01); *B29C 66/8246* (2013.01); *B29C*
*66/9513* (2013.01)

(58) Field of Classification Search
CPC .......... B29C 66/92445; B29C 66/9513; B29C
66/0242; B29C 66/8246; B29C 66/8242
USPC ........ 156/64, 73.1, 350, 351, 358, 362, 363,
156/378, 379
See application file for complete search history.

(56) References Cited

U.S. PATENT DOCUMENTS

| | | | |
|---|---|---|---|
| 4,340,166 A | 7/1982 | Bilane et al. | 228/179 |
| 4,496,095 A | 1/1985 | Renshaw et al. | 228/102 |
| 4,713,131 A | 12/1987 | Obeda | 156/73.1 |
| 4,750,970 A | 6/1988 | Malosh | 156/580 |
| RE33,063 E | 9/1989 | Obeda | 153/73.1 |
| 4,936,502 A | 6/1990 | Schlarb et al. | 228/102 |
| 4,975,133 A | 12/1990 | Gochermann | 156/73 |
| 5,110,381 A | 5/1992 | Heckard et al. | |
| 5,295,700 A | 3/1994 | Crews et al. | 279/5 |
| 5,329,750 A | 7/1994 | Bagley et al. | 53/559 |
| 5,378,951 A | 1/1995 | Snyder | 310/17 |
| 5,397,408 A | 3/1995 | Guzik | |
| 5,491,372 A | 2/1996 | Erhart | 310/80 |
| 5,557,154 A | 9/1996 | Erhart | 310/80 |
| 5,562,242 A | 10/1996 | Manzo et al. | 228/2.1 |
| 5,706,627 A | 1/1998 | Kirka et al. | 53/52 |
| 5,707,414 A | 1/1998 | Leidy | 65/158 |
| 5,749,987 A | 5/1998 | Wannebo | 156/64 |
| 5,772,814 A * | 6/1998 | Grewell | B23K 31/125 |
| | | | 156/351 |
| 5,788,791 A | 8/1998 | Grewell | 156/731 |
| 5,795,419 A | 8/1998 | Lotz et al. | |
| 5,798,599 A | 8/1998 | Harwood | 310/323 |
| 5,829,115 A | 11/1998 | Speller, Jr. et al. | 295/250 |
| 5,846,377 A * | 12/1998 | Frantz | B29C 66/92921 |
| | | | 156/359 |
| 5,880,580 A | 3/1999 | Johansen | 323/282 |
| 5,985,064 A | 11/1999 | Sato | |
| 6,036,796 A | 3/2000 | Halbert et al. | |
| 6,118,095 A | 9/2000 | Nagano | 219/110 |
| 6,190,296 B1 | 2/2001 | Gnad et al. | |
| 6,289,736 B1 | 9/2001 | Statnikov | |
| 6,364,977 B1 * | 4/2002 | Simon | B06B 1/0261 |
| | | | 156/351 |
| 6,450,393 B1 | 9/2002 | Doumanidis et al. | 228/110 |
| 6,491,785 B1 | 12/2002 | Sato et al. | |
| 6,517,652 B1 | 2/2003 | Gratz | 156/73.5 |
| 6,588,644 B2 | 7/2003 | Simon | 228/1.1 |
| 6,787,729 B2 | 9/2004 | Dugas et al. | 219/863 |
| 6,824,040 B2 | 11/2004 | Honeck et al. | 228/110.1 |
| 6,828,522 B2 | 12/2004 | Hochhalter et al. | 219/863 |
| 6,836,057 B2 | 12/2004 | Hata | 310/328 |
| 6,891,183 B2 | 5/2005 | Kitamura et al. | 250/559 |
| 6,951,052 B2 | 10/2005 | Clew | 29/525 |
| 6,965,091 B2 | 11/2005 | Terada et al. | 219/121 |
| 6,984,921 B1 | 1/2006 | Kosterman | 310/323 |
| 7,002,095 B2 | 2/2006 | Kato et al. | 219/864 |
| 7,141,752 B2 | 11/2006 | Hochhalter et al. | 219/862 |
| 7,399,373 B2 | 7/2008 | Fernando | 156/73.1 |
| 7,449,084 B2 | 11/2008 | Nakakado | 156/580.1 |
| 7,520,308 B2 | 4/2009 | Siegler et al. | 156/359 |
| 7,819,158 B2 | 10/2010 | Klinstein et al. | |
| 2002/0017883 A1 | 2/2002 | Marcinkiewicz et al. | |
| 2002/0038792 A1 | 4/2002 | Terada et al. | 219/121.6 |
| 2002/0148878 A1 | 10/2002 | Honeck et al. | |
| 2004/0069750 A1 | 4/2004 | Kato et al. | 219/86.1 |
| 2004/0241267 A1 | 12/2004 | Schultz | 425/193 |
| 2005/0077855 A1 | 4/2005 | Hochhalter et al. | 318/567 |
| 2005/0194491 A1 | 9/2005 | Hatano | |
| 2005/0241143 A1 | 11/2005 | Mizuno et al. | |
| 2005/0284559 A1 | 12/2005 | Ripplinger et al. | |
| 2006/0011700 A1 | 1/2006 | Trabandt et al. | |
| 2006/0144906 A1 | 7/2006 | Sheehan et al. | |
| 2006/0196916 A1 * | 9/2006 | Goldstein | B23K 9/08 |
| | | | 228/114.5 |
| 2006/0220599 A1 | 10/2006 | Siegler et al. | |
| 2007/0052362 A1 | 3/2007 | Cha | |
| 2007/0068991 A1 | 3/2007 | Handel et al. | |
| 2007/0257087 A1 | 11/2007 | Klinstein et al. | 228/101 |
| 2007/0272723 A1 | 11/2007 | Kimura et al. | |
| 2010/0047079 A1 | 2/2010 | Reinschke | |
| 2011/0036478 A1 * | 2/2011 | Castro | B05D 7/14 |
| | | | 156/73.1 |
| 2011/0108181 A1 * | 5/2011 | Cai | B23K 20/10 |
| | | | 156/64 |

FOREIGN PATENT DOCUMENTS

| | | |
|---|---|---|
| DE | 4026711 | 2/1992 |
| DE | 4317621 | 6/1994 |
| DE | 4321874 | 1/1995 |
| DE | 19753740 | 7/1999 |
| DE | 69528314 | 8/2002 |
| DE | 10354526 | 6/2005 |
| DE | 102006009259 A1 | 8/2007 |
| DE | 102006054760 | 5/2008 |
| EP | 0421019 A1 | 4/1991 |
| EP | 0421018 | 3/1994 |
| EP | 1063760 A2 | 12/2000 |
| JP | H10128552 | 5/1998 |
| JP | 2006-231698 A | 9/2006 |
| WO | 2004/034561 | 4/2004 |

OTHER PUBLICATIONS

PCT International Written Opinion for International Application No. PCT/US2007/011011 dated Feb. 28, 2008, 4 pages.
"Ultrasonic Metal Bonding System Bonding Process." Ultex: Ultrasonic Laboratory. Sep. 7, 2005 (1 page).
European Extended Search Report for Application No. EP 09005008.9 dated Aug. 5, 2010 (11 pages).
European Extended Search Report corresponding to co-pending EP Application No. 11173749.0, dated Oct. 28, 2013, 8 pages.
Veröffentlichung des Zentralverbandes der Elektrotechnik- und Elektronikindustrie e.V. (ZVEI): „Fügen von Formteilen und Halbzeugen aus thermoplastischen Kunststoffen mit Ultraschall, 1985, Fachverband Elektroschweißen, Frankfurt, DEXP00205090212405 (56 pages).
Titel: Zeitgea.beta.e Kunststoff-Verbindungsteechnik . . . : fur Thermoplaste; konstruktive u. techn. Arbeitshilfen; substituierende u. alternaive Fugetechnik, Verlag: Limeshain: Groeble, infotip, Erscheinungsjahr 1986, 304 Seiten, ISBN 3-88736-005-2.
Michaeli W et al.: "Bessere Nahtqualitaet Beim Ultraschallschweissen. \Better Weld Quality in Ultrasonic Welding", Kunststoffe, Carl Hanser Verlag, Munchen, DE, vol. 83, No. 9, Sep. 1, 1993, pp. 667-670 (3 pages).
Fachbuchreihe Schweißtechnik Band 151, Title: "Ultraschallfügen und—Trennen", Prof. Dr.-Ing. habil. Johannes Wodara, Magdeburg, ISBN 3-87155-212-7, DVS-Verlag GmbH, Düsseldorf, 2004 (9 pages).
PCT International Search Report for International Application No. PCT/US2007/011011 dated May 8, 2006, 5 pages.
European Extended Search Report for Application No. EP 11173749.0, dated Oct. 28, 2013 (8 pages).

* cited by examiner

VIBRATION WELDERS WITH HIGH FREQUENCY VIBRATION, POSITION MOTION CONTROL, AND DELAYED WELD MOTION

CROSS-REFERENCE TO RELATED APPLICATION

This application claims the benefit of U.S. Provisional Patent Application Ser. No. 61/974,246, filed Apr. 2, 2014, entitled, "Vibration Welders with High Frequency Vibration, Position Motion Control, and Delayed Weld Motion," and U.S. Provisional Patent Application Ser. No. 61/823,101, filed May 14, 2013, entitled, "Provisional Patent Application for Vibration Welders with High Frequency Vibration, Position Motion Control, and Delayed Weld Motion," both of which are incorporated herein in their entirety.

FIELD OF THE INVENTION

The present disclosure relates to vibration welding, particularly to the frequency of vibration and methods of controlling the pressing action between two workpieces.

BACKGROUND

Linear vibration welders are used in the industry to weld two plastic parts by creating linear oscillatory motion of one part relative to another part. As the parts are pressed together by force, the oscillatory motion generates heat, which melts the adjoining surfaces of the plastic parts and creates a weld after the parts cool.

The vibratory movement of one part relative to another part is generated by two electromagnets positioned between movable and stationary components of the welder. The movable head components are physically coupled to the stationary components via a series of mechanical spring elements. Both electromagnets apply force along the same coordinate line, but in opposite directions. The electromagnets are energized with a 180° phase shift so that when the first electromagnet is energized, the second electromagnet is de-energized. Conversely, when the second electromagnet is energized, the first electromagnet is de-energized.

It is desirable to maintain the frequency of the energizing cycles at the resonant frequency of the movable mechanical part of the welder to allow for maximum energy transfer to the parts being welded. The resonant frequency is a function of the combined stiffness of the spring elements and the mass of all vibrating elements. Several methods are known in the art for determining the resonant frequency in vibration welding systems.

Typical resonant frequencies for vibration welding of plastic parts are in the range of 200-250 Hz for small to medium-sized parts, and 100-120 Hz for large parts. While historically this range has been sufficient to achieve acceptable results in most applications, the requirements for weld quality, especially relating to aesthetics, continue to rise. One such requirement is the minimization of the amount of plastic that is ejected laterally from the weld joint area, commonly referred to as flash. The generation of flash is integral to the weld process, occurring when the reciprocating motion causes the molten plastic to be pushed away from the joint area while the parts are pressed together. The amount of flash is partially dependent on the amplitude of vibration, with less flash being produced at lower amplitudes. However, there is a limit to how much the amplitude can be reduced before the linear velocity at the weld joint becomes insufficient to generate the heat required for adequate melting. With these competing requirements, undesirable amounts of flash are sometimes produced when the amplitude selected favors heat generation over minimizing flash in order to achieve the desired weld strength. Another requirement is the minimization of the quantity of small pieces of the plastic material which are produced as a result of part abrasion before melting occurs, referred to as particulate.

One existing technique for reducing both the amount of flash and particulate is the heating of the weld joint areas of the parts to be welded by a separate process prior to vibration welding. The heat is usually applied by non-contact means, such as infra-red light. While this approach has been shown to improve weld results, there are disadvantages to its use. First, the welding equipment is considerably more expensive because a pre-heating stage is necessary. Second, the time required to position the pre-heating elements in proximity to the parts, wait for the parts to warm up, and then to retract the elements away from the parts significantly increases the overall cycle time, thus reducing production rates.

Another technique for reducing flash is the use of higher frequencies of vibration compared to the typical 200-250 Hz range. No machine heretofore has been successfully developed to operate at higher frequency ranges.

BACKGROUND

An aspect of the present concepts relates to a method of controlling the pressing action between the parts to be joined. In vibration welding, melting of the plastic part interface is achieved when the parts are pressed together while one part vibrates relative to the other. The pressing action traditionally consists of applying either a constant force between the parts, or a force that varies based on a profile assigned prior to welding. This method of control has several limitations. First, the position of the first part in relation to the second part is not directly controlled, which reduces the accuracy and consistency of the collapsed height of the joined assembly. Second, the position of the first part relative to the second part cannot be statically maintained at some stages of the weld process, such as during the time after vibrations are halted but the plastic has not yet solidified, where the parts continue to move relative to each other due to the applied pressing force. Third, the speed of weld collapse is not directly controlled but is rather the result of the applied force and the dynamically changing compliance of the plastic parts. Benefits of overcoming the latter limitations, among other benefits, are set forth in the description of the present disclosure and as summarized below by way of a few non-limiting examples.

According to an aspect of the present disclosure, a vibration welding system is disclosed, where the operating vibration frequency is 260 Hz or higher.

According to another aspect of the present disclosure, a vibration welding system is disclosed, where the pressing action is effected by directly controlling, with a control system and at least one sensor, the relative position of the first workpiece to the second workpiece during some phase or the entirety of the weld cycle. The relative position of the workpieces can be maintained immediately after, or some time after, the vibrations are terminated.

According to a further aspect of the present disclosure, a vibration welding system is disclosed which includes an external control device coupled to the control system to produce at least one input signal to the control system to adjust the speed of relative motion between the first workpiece and the second workpiece, the force between the workpieces, or both speed and force on-the-fly based on an algorithm using said input signal.

According to yet another aspect of the present disclosure, a vibration welding system is disclosed in which the speed of collapse between the first workpiece and the second workpiece is independently programmable to be constant or variable during each of the various phases of the weld cycle, including melting and solidification.

According to a still further aspect of the present disclosure, a vibration welding system is disclosed where the pressing action between the first workpiece and the second workpiece is effected by controlling the speed between the workpieces during some phases of the weld cycle, and controlling the force between the workpieces during other phases of the weld cycle.

According to a further aspect of the present disclosure, a vibration welding system is disclosed in which a predetermined positive force is initially applied between the first workpiece and the second workpiece, and where the weld is started by initiating lateral vibrations while the relative position between the workpieces in the pressing direction is maintained, a control variable is monitored, and the second workpiece is moved relative to the first workpiece only after the monitored control variable satisfies a predetermined condition. The predetermined condition can be a specified force, or a specified power, or a specified cumulative power, or a specified voltage, or a specified current, or a specified cumulative current output from the vibration drive, and any quantity derived from the foregoing conditions. Alternately, the predetermined condition can be elapsed time. Alternately, the predetermined condition can be a sensed temperature of one or more areas of the workpieces being welded. Alternately, the predetermined condition can be a parameter associated with the actuating means of pressing the workpieces together, including the pressure of a fluid or pneumatic system, or the torque or linear force of an electric actuator. The amplitude of vibration, during the period when the relative position between the workpieces is maintained while vibrations are active, can be a fraction of the amplitude employed after subsequent pressing motion between the workpieces is initiated.

According to a still further aspect of the present disclosure, a vibration welding system is disclosed where the interface between the workpieces is pre-heated immediately before initiation of the weld process by operating the system at a reduced amplitude of vibration while the workpieces are urged together.

According to yet another aspect of the present disclosure, a vibration welding method is disclosed in which the operating vibration frequency is 260 Hz or higher.

According to an additional aspect of the present disclosure, a vibration welding method is disclosed in which first and second workpieces are pressed together by directly controlling the relative position of the first workpiece to the second workpiece. The relative position of the workpieces can be maintained immediately after, or some time after, the vibrations are terminated.

According to a still further aspect of the present disclosure, a vibration welding method is disclosed in which the speed of relative motion between a first workpiece and a second workpiece or the force between the workpieces is adjusted on-the-fly based on an algorithm in response to an input signal from an external control device coupled to the control system.

According to yet an additional aspect of the present disclosure, a vibration welding method is disclosed where the speed of collapse between the first workpiece and the second workpiece is constant or variable during each of the various phases of the weld cycle, including melting and solidification.

According to another aspect of the present disclosure, a vibration welding method is disclosed in which the pressing action between a first workpiece and a second workpiece is effected by controlling the speed between the workpieces during some phases of the weld cycle, and controlling the force between the workpieces during other phases of the weld cycle.

According to a further aspect of the present disclosure, a vibration welding method is disclosed in which a predetermined positive force is initially applied between a first workpiece and a second workpiece, and where the weld is started by initiating lateral vibrations while the relative position between the workpieces in the pressing direction is maintained, a control variable is monitored, and the second workpiece is moved relative to the first workpiece only after the monitored control variable satisfies a predetermined condition. The predetermined condition is a specified force, or a specified power, or a specified cumulative power, or a specified voltage, or a specified current, or a specified cumulative current output from the vibration drive. Alternately, the predetermined condition is elapsed time. Alternately, the predetermined condition is a sensed temperature of one or more areas of the workpieces being welded. Alternately, the predetermined condition is a sensed parameter associated with the actuating means of pressing the workpieces together, including the pressure of a fluid or pneumatic system, or the torque or linear force of an electric actuator. The amplitude of vibration, during the period when the relative position between the workpieces is maintained while vibrations are active, can be a fraction of the amplitude employed after subsequent pressing motion between the workpieces is initiated.

According to a still further aspect of the present disclosure, a vibration welding method is disclosed where the interface between the workpieces is pre-heated immediately before initiation of the weld process by employing a reduced amplitude of vibration while the workpieces are urged together.

BRIEF DESCRIPTION OF THE DRAWINGS

The present disclosure can best be understood by reference to the following description taken in conjunction with the accompanying drawings, in which.

DETAILED DESCRIPTION

Although the present disclosure will be described in connection with certain preferred embodiments, it will be understood that the present disclosure is not limited to those particular embodiments. On the contrary, the present disclosure is intended to cover all alternatives, modifications, and equivalent arrangements as may be included within the spirit and scope of the invention as defined by the appended claims.

Figure 1:
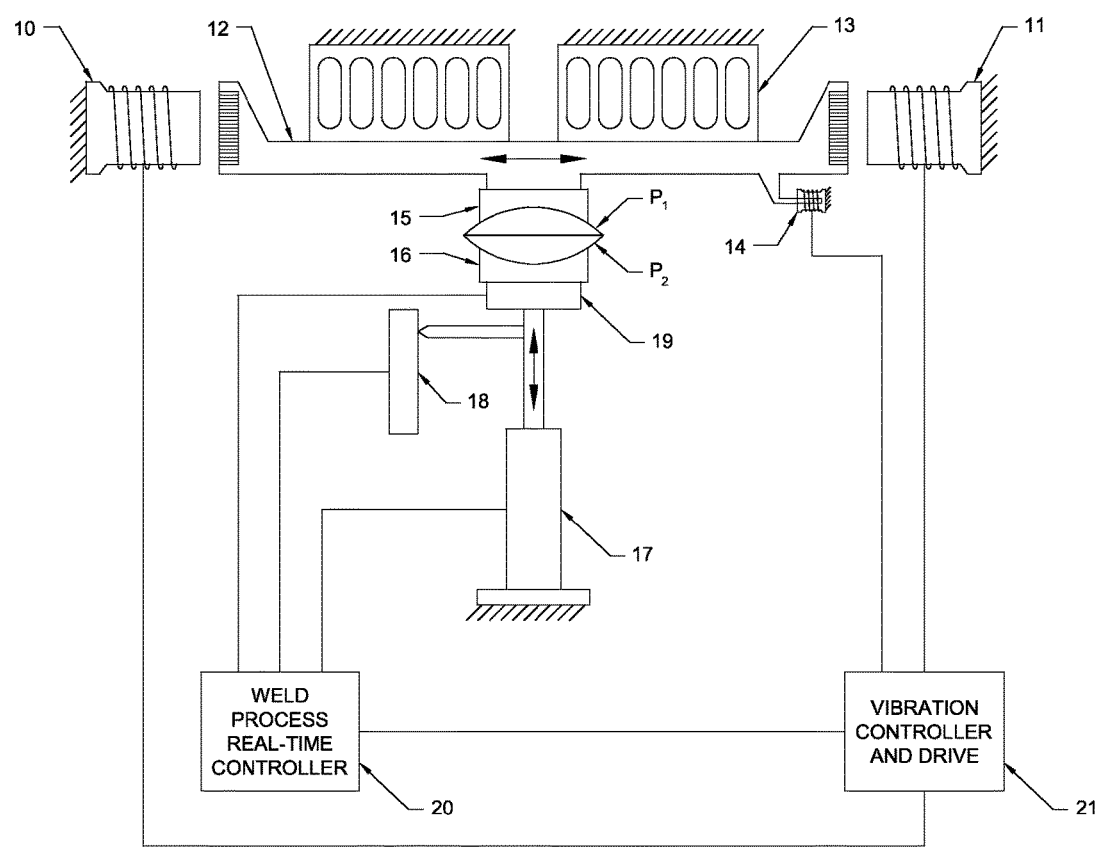
FIG. 1 is a schematic diagram of a vibration welder.

FIG. 1 illustrates a linear vibration welder that includes two stationary electromagnets 10 and 11 (e.g., attached to a stationary frame) at opposite ends of a moving element 12 that carries a plastic part P1 which is firmly attached to the moving element 12 via a support structure 15. The moving element 12 is connected to a stationary frame through a series of mechanical spring elements 13. As the electromagnet 10 is energized, the moving element 12 of the welder is moved to the left (as viewed in FIG. 1), and as the electromagnet 11 is energized, the moving element 12 is moved to the right. The two electromagnets are energized and de-energized sequentially, with a substantially 180° phase shift, to cause vibration of the moving element 12 and the plastic part P1. As the part P1 is vibrated, it is pressed against a laterally stationary plastic part P2, mounted in a support structure 16, by a linear actuator 17, such as a hydraulic cylinder or an electric actuator, so that the oscillatory motion of the vibrating plastic part P1 relative to part P2 generates heat that causes the engaging surfaces of both plastic parts to melt, resulting in the two parts welding together as vibration is halted.

The linear actuator 17 is controlled by a weld process real-time controller 20, which continuously samples values from a linear position sensor 18. The sampled value from the linear position sensor 18 indicates the position of the part P2 relative to the part P1. In addition, a force or pressure sensor 19 may be integrated to indicate the force or pressure between the parts P1 and P2 and continuously sampled by the controller 20. This force or pressure is typically used to initiate vibrations once a setpoint has been reached. The sampled values from the linear position and force or pressure sensors may be provided as feedback to the controller 20 for precisely monitoring the position of the part P2 and the force or pressure between two engaged parts, for controlling the actuator position or force.

The system illustrated in FIG. 1 also includes a vibration sensor 14, which may be an inductive sensor or any other sensor detecting vibration of the moving element 12. The moving part of the sensor 14 is firmly linked with the moving element 12 so that the AC (alternating current) EMF (electromagnetic force) in the coil of the sensor 14 reflects the amplitude and frequency of the movement of the element 12. The output of the sensor 14 is sampled by the vibration controller and drive module 21, and is used to measure the system resonant frequency as well as to control the amplitude of vibration during the welding process.

Although FIG. 1 shows the weld process real-time controller 20 and the vibration welder and drive module 21 as separate entities, they may be combined into a single unit which controls all aspects of the welder and provides power to the electromagnets.

An aspect of the present invention relates to the frequency of vibration during welding. For the illustrated vibration welder, the resonant frequency of vibration is determined by the combined stiffness of the spring elements 13 and the mass of all the vibrating elements, including the moving element 12, the plastic part P1 and the support 15 to which it is attached, and the equivalent mass of the spring elements 13. The relationship governing the resonant frequency can be closely approximated by:

$$F_n = \frac{1}{2\pi}\sqrt{\frac{K}{M}}$$

where
$F_n$ is the resonant frequency;
K is the total stiffness of the spring elements; and
M is the total mass of the moving elements.

By increasing the stiffness of the spring elements 13, the resonant frequency becomes larger for the same total mass. Using this approach, a welding machine can be constructed, which operates above the traditional frequency range of 200-250 Hz, such as, but not limited to, a frequency at or above 260 Hz, a frequency between about 260-400 Hz, a frequency between about 260-360 Hz (e.g., plus or minus a few percent), or a frequency within a range that is a subset of the above ranges. A benefit of higher frequency vibrations, coupled with a reduction in vibration amplitude, is the reduction of flash without adversely affecting weld strength. This benefit was evident in an experiment, in which a number of samples of an automotive tail light assembly were welded at traditional and higher frequencies. The first set of samples was welded at approximately 208 Hz and 1.2 mm peak-to-peak amplitude. The second set of samples was welded at approximately 308 Hz and 0.5 mm peak-to-peak amplitude. The second set had considerably less flash and a more even distribution of melt along the weld joint, while both sets exhibited good strength characteristics.

Although a typical vibration welder configuration comprises a set of spring elements as described above, the concept of welding at higher frequencies is not limited to this kind of arrangement. The present concepts can be extended to systems which operate at similar frequencies but do not use mechanical spring elements.

Another aspect of the present disclosure relates to a method of controlling the pressing action between the parts to be joined; namely, by using closed-loop position control rather than the force control method traditionally employed on vibration welding machines. With the position sensor 18 providing feedback to the weld process controller 20, the extension of the actuator 17, and hence the relative position of part $P_2$ to part $P_1$, can be directly controlled. In addition, the speed of motion of the actuator 17, and hence the rate of collapse between the plastic parts, can be controlled. There are several advantages to employing this control method.

Figure 2:
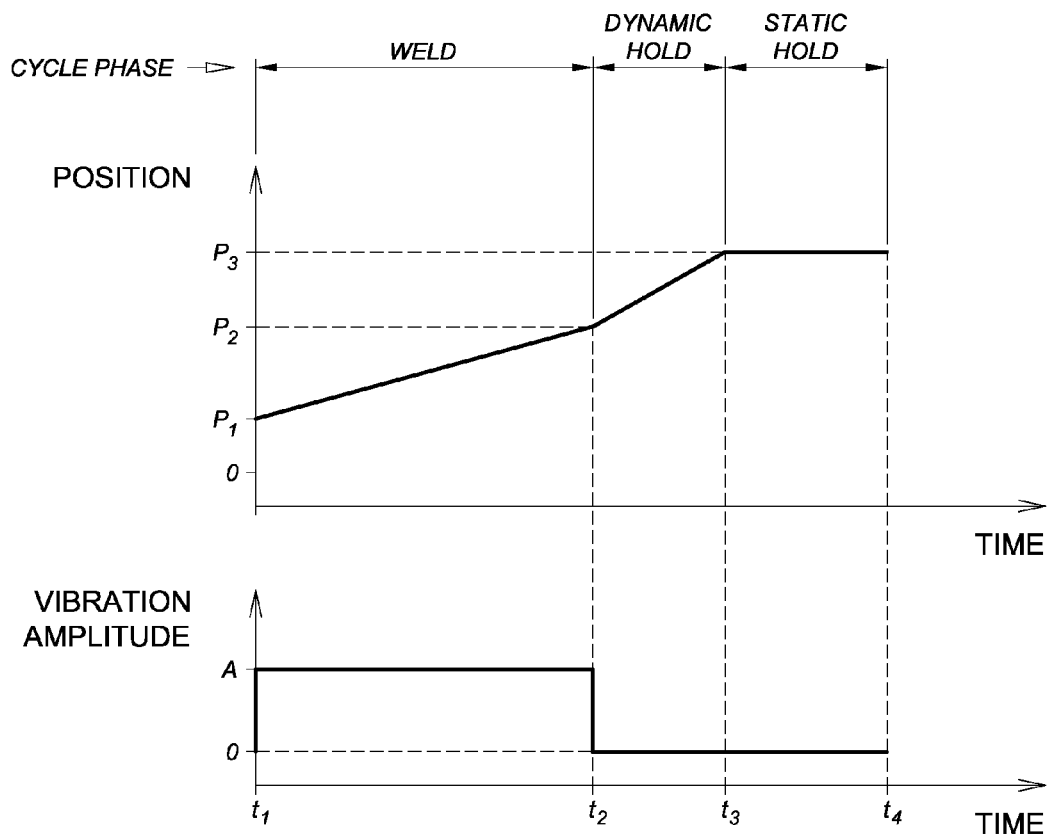
FIG. 2 is a set of graphs consisting of position and vibration amplitude versus time to illustrate the concepts of dynamic hold and static hold.

First, the accuracy and repeatability of the height of the joined assembly is enhanced by the fact that the control system dynamically seeks to achieve the desired collapse in the parts. A typical weld cycle includes a "weld" phase, during which melting occurs, and a subsequent "hold" phase, when the plastic cools and solidifies. In a traditional force control system, a prescribed force is applied for a set duration of time during the hold phase, causing the parts to collapse further. The amount of collapse during the hold is not directly controlled and is in part dependent on several factors, including the geometric consistency of the parts being welded, the uniformity of filler material distribution within the parts, repeatability of the welder in controlling the pressing force, and the consistency of the rate of solidification process, which is affected by ambient conditions. The variation in the amount of the resulting hold collapse directly affects the consistency of the final height of the welded assembly, which can be an important requirement in vibration welding. Conversely, in a position control system, the hold collapse is directly controlled, where, once vibrations cease, first the parts are collapsed by a prescribed distance, a phase termed "dynamic hold," then the position of the actuator 17 is maintained for a prescribed duration, a phase termed "static hold," allowing the plastic to solidify while the part positions are fixed relative to each other. This concept is illustrated in FIG. 2, which shows graphs of position sensed by the linear position sensor 18 and vibration amplitude versus time at several phases of the machine cycle. The weld phase is indicated between time t1 and t2, where the position advances from positions P1 to P2 while vibrations with amplitude A are applied. At the termination of vibrations, corresponding to time t2, the dynamic hold phase begins and continues until the desired dynamic hold distance is achieved, which occurs when position P3 is reached. The static hold phase follows immediately, during which the actuator position is maintained at point or location P3 for a predetermined duration (time period t4-t3).

Using this approach, the final assembly height is not affected by the factors mentioned for the force control system, yielding more accurate and repeatable results.

A further benefit of the ability to maintain a fixed relation between the parts during the static hold phase is that as the plastic solidifies, newly formed molecular bonds are not broken by continuing part motion which can occur with force control systems.

Figure 3:
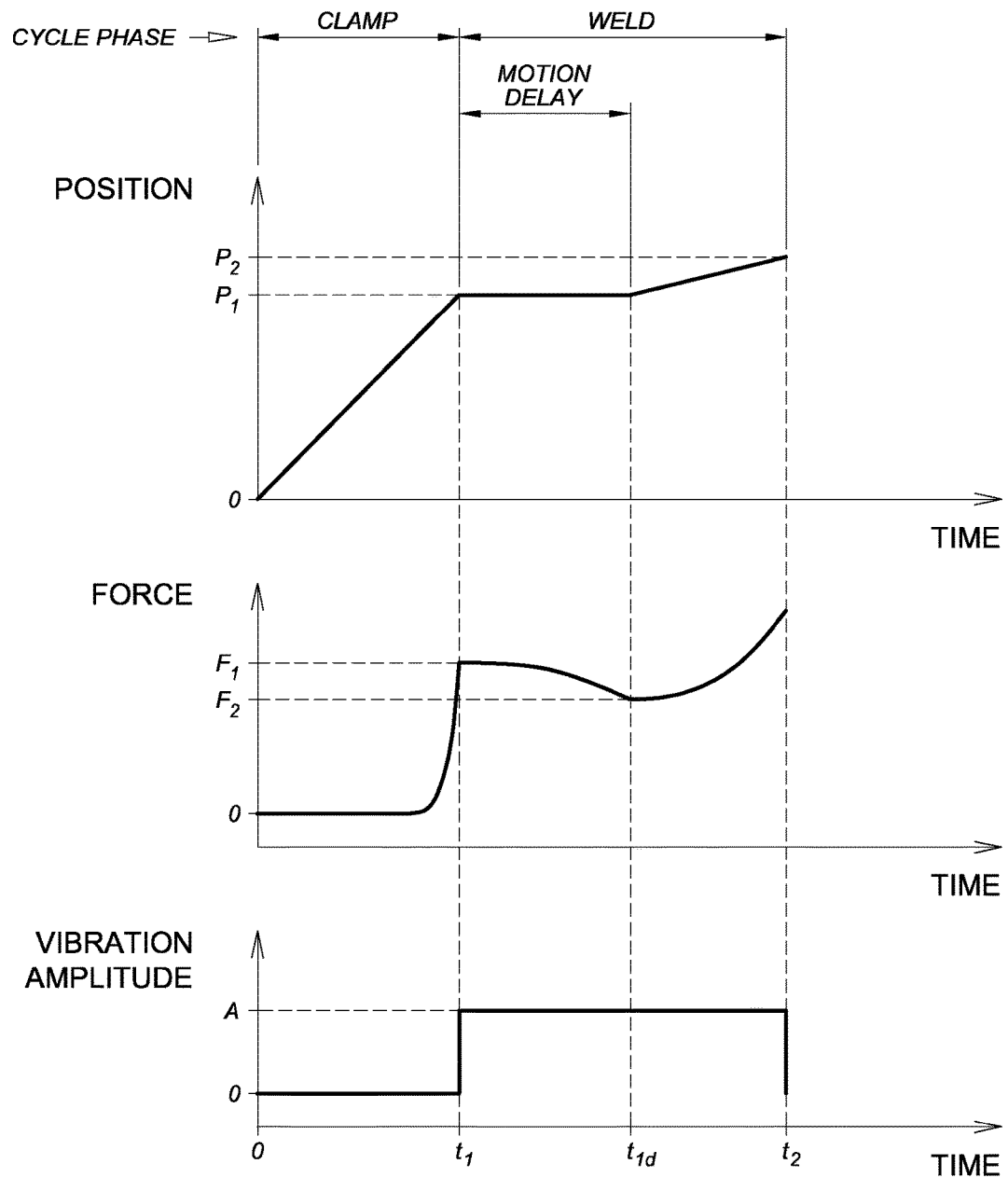
FIG. 3 is a set of graphs consisting of position, force, and vibration amplitude versus time to illustrate the concept of delayed motion at the start of the weld phase.

Second, utilizing the position control method facilitates the implementation of a particular technique during the initial phase of the weld, which consists of delaying the relative collapse motion between the parts following the initiation of vibrations. This technique is employed in ultrasonic plastic welding as described in U.S. Pat. No. 8,052,816, hereby incorporated by reference in its entirety. For example, the actuator 17 is first extended to compress the unwelded parts until a prescribed positive initial force is achieved. The weld is then initiated by activating vibrations, and a control variable is monitored, using at least one sensor. The actuator then maintains its position until the signal corresponding to the monitored control variable satisfies a predetermined condition. Once this condition is satisfied, the actuator is extended in accord with the assigned weld motion profile. An example is the sensing of the force applied to the parts as the control variable, and maintaining the actuator position following the initiation of welding until the force drops below a programmable threshold (for instance, a 10% reduction of the initial force). This example is illustrated in FIG. 3, which shows graphs of position sensed by the linear position sensor 18, force between parts as measured by force sensor 19, and vibration amplitude versus time for two phases of the machine cycle. In the first phase (clamp), the actuator is advanced from position 0 at time 0 until the clamp force reaches a predetermined level F1, detected at time t1. At this point, the vibrations are initiated and the weld starts, but the position is maintained at position P1. When the plastic material softens and the force decreases to a predetermined level F2, detected at time t1*d*, weld motion commences as shown by the advance in position immediately after time t1*d*. A second example is the sensing of current being supplied to an electric actuator (for instance, a servo actuator), and maintaining the actuator position following initiation of welding until the current falls below a programmable threshold. A third example is the sensing of actuating pressure of a hydraulic cylinder, and maintaining the cylinder position following the initiation of welding until the pressure falls below a programmable threshold.

With the application of this technique, the welding system is capable of dynamically sensing when the weld joint area has been sufficiently pre-heated to soften or begin melting the material. Since the relative part positions are maintained during this initial warming phase, less particulate will be generated compared to the standard method of applying a constant force.

Figure 4:
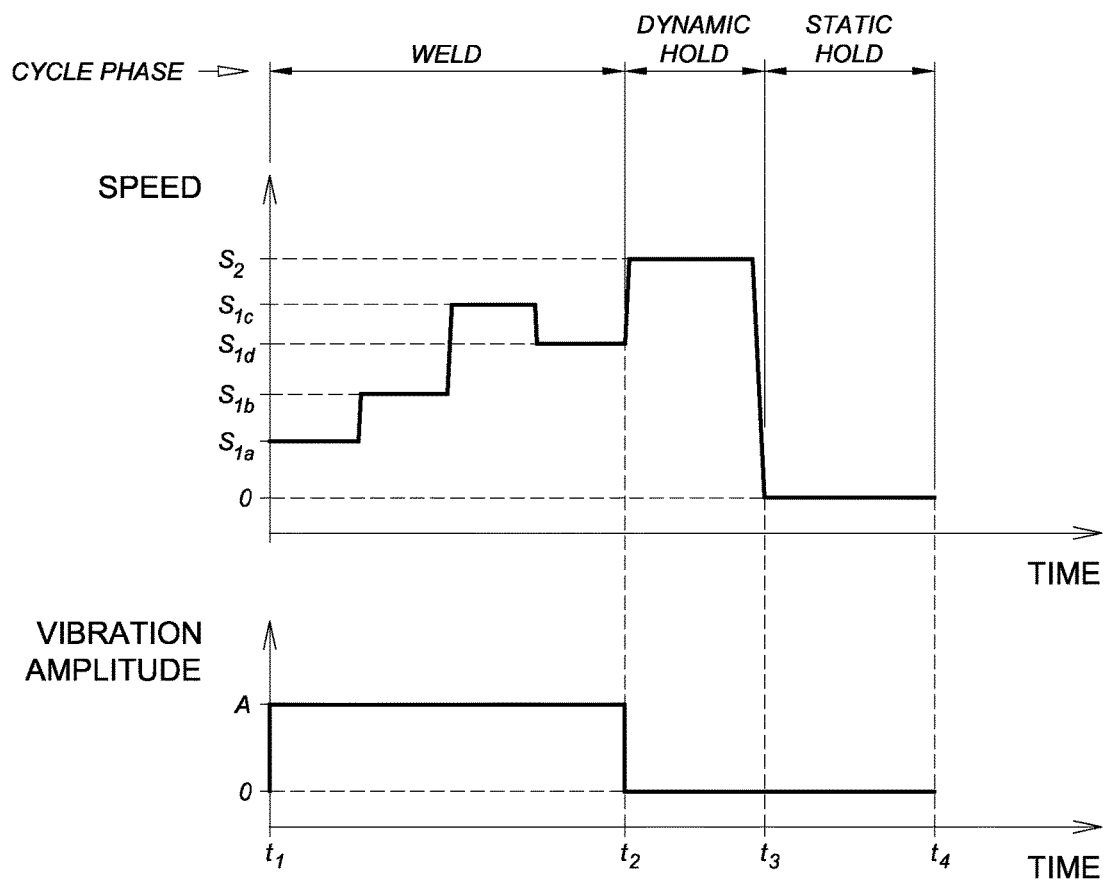
FIG. 4 is a set of graphs consisting of speed and vibration amplitude versus time to illustrate the concept of controlling the speed of part collapse.

Third, the position control method allows for directly controlling the speed of part collapse. The speed can be programmed to be either constant or variable during the weld phase. In addition, a constant or variable speed can be independently programmed for the dynamic hold phase. An example of utilizing variable speed during the weld phase and constant speed during the dynamic hold phase is illustrated in FIG. 4, containing graphs of the speed of motion of actuator 17 (time rate of change of position sensed by the linear position sensor 18) and the vibration amplitude versus time. During the weld phase, spanning time range t1 to t2, the speed of the actuator changes in a predetermined sequence S1*a*-S1*b*-S1*c*-S1*d*, where each speed is in effect for some portion of the weld phase. When the weld ends at time t2, vibrations cease and the actuator 17 advances at a constant dynamic hold speed S2 until time t3, when, if desired, actuator position is subsequently maintained for the duration of static hold time. This approach provides additional options in the control of part collapse not available with existing systems.

Although the present concept refers to controlling the speed of collapse during the weld and hold phases, a hybrid method of motion control is also envisioned. For example, speed control can be utilized for some phases of the cycle, and force control for other phases of the same cycle to achieve optimal weld results.

Figure 5:
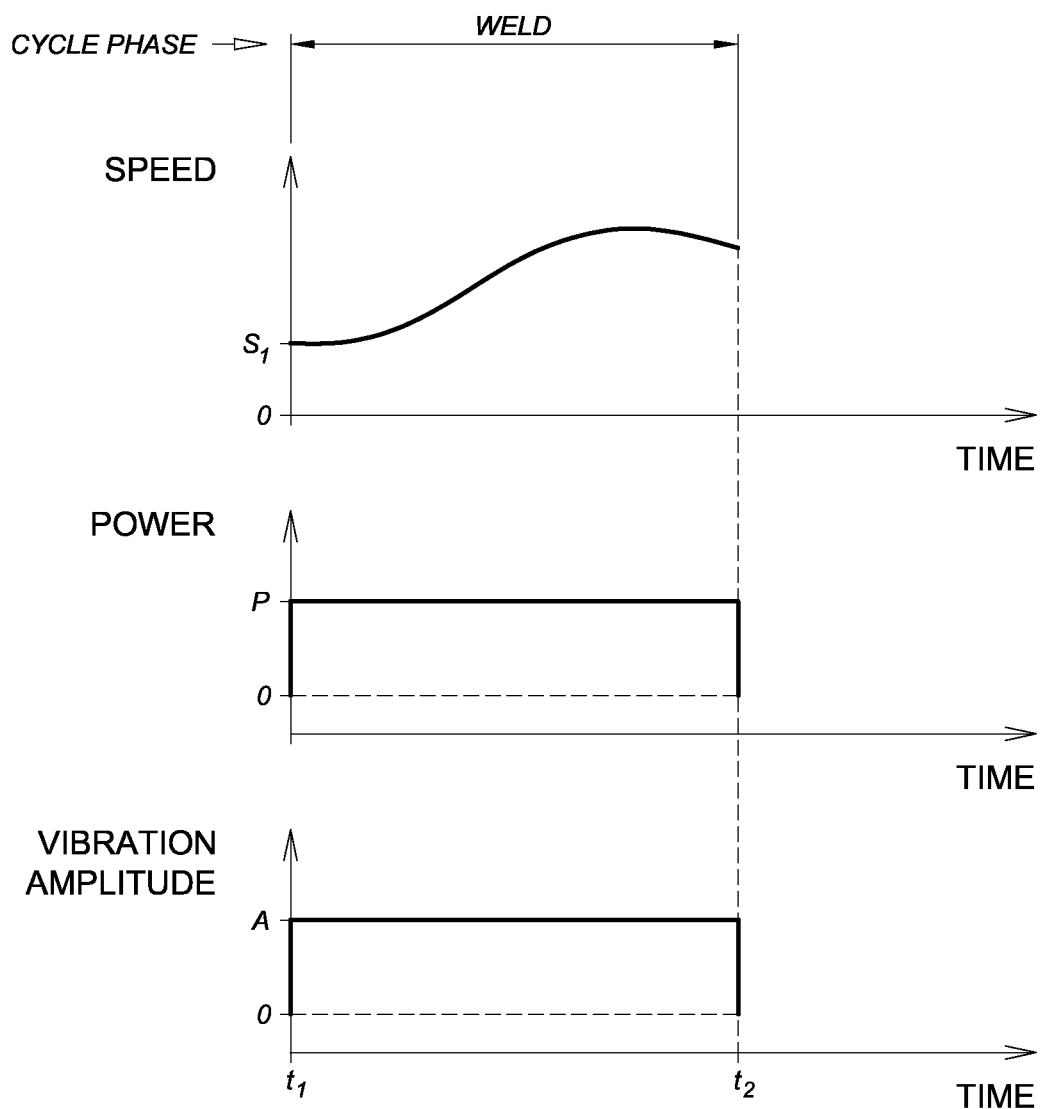
FIG. 5 is a set of graphs consisting of speed, power, and vibration amplitude versus time to illustrate the concept of automatic speed control.

Another aspect of the present disclosure relates to the automatic (on-the-fly) adjustment of the speed of collapse between the parts or the force between the parts during various phases of the weld cycle, including melting and solidification. The weld process controller 20 is configured to accept inputs from one or more sensors, and an algorithm is used to automatically change the speed or force based on the input signal(s) to satisfy a predetermined criterion. For example, if the amount of power being supplied by the vibration drive 21 is continuously fed back to the controller 20 as the input signal, the algorithm can adjust the speed of part collapse on-the-fly in order to maintain a prescribed level of drive power output. This example is illustrated in FIG. 5, which shows graphs of the speed of motion of actuator 17, the power supplied by the drive 21, and vibration amplitude versus time during the weld phase. Once vibrations start, the speed, initially at a value of speed S1, is automatically adjusted by the system for the duration of the weld, represented by the curve on the speed graph, in order to maintain the power output at a constant level P (power).

Figure 6:
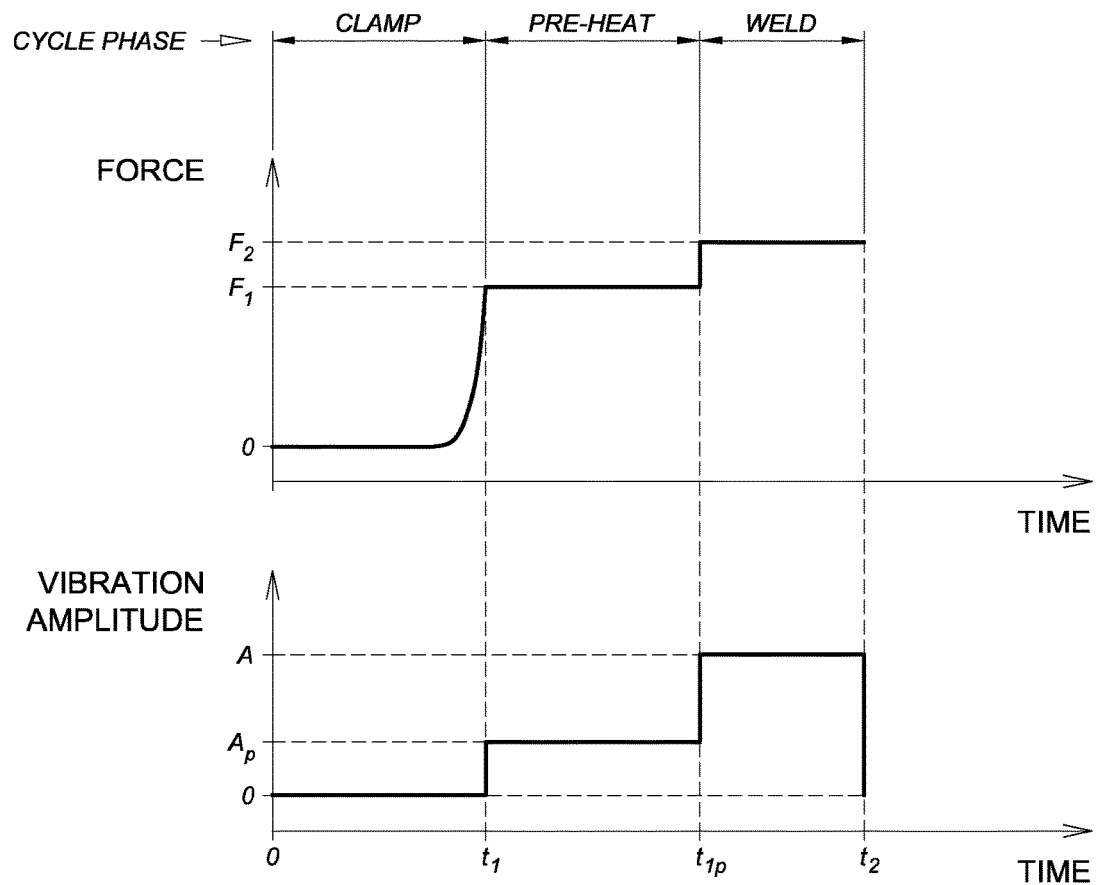
FIG. 6 is a set of graphs consisting of force and vibration amplitude versus time to illustrate the concept of pre-heating using low amplitude vibration.

A still further aspect of the present disclosure relates to the use of low amplitude vibrations as a means of pre-heating the unwelded parts. By first pressing the parts together with a prescribed force and then initiating vibrations at a low amplitude (for instance, ½ of the optimal weld amplitude), the interface between the parts will heat up without necessarily causing melting. Because the degree of scrubbing during this phase is limited, the amount of particulate generated will be minimal. Once the parts are pre-heated, the usual weld process follows immediately. This implementation is illustrated in FIG. 6, which shows graphs of the force between parts as measured by the sensor 19 and vibration amplitude-versus-time for several phases of the machine cycle. In the first phase (clamp), the actuator is advanced from time 0 until the clamp force reaches a predetermined level F1, detected at time t1. At this point, the vibrations are initiated at a pre-heat amplitude, Ap, a fraction of the subsequent weld amplitude A, which is maintained for a predetermined time duration (t1p-t1). Upon the completion of the pre-heat phase, the weld phase follows, which, in this example, is represented by a constant force F2 and vibration amplitude A. Although the change in amplitude from Ap to A is shown in FIG. 6 to be abrupt, a gradual ramp-up of amplitude can alternatively be employed. A benefit of this method of pre-heating the parts is a reduction in the amount of flash and particulate of the welded assembly similar to that already demonstrated by employing non-contact pre-heat means. This benefit was demonstrated in welding trials of two sets of test parts. The welder settings for the first set consisted of an operating frequency of 305 Hz, vibration amplitude of 0.8 mm, clamp force of 5500 N, and a weld collapse distance of 1.00 mm. The settings for the second group were identical to the first, except for the addition of a pre-heat phase consisting of 15 seconds of vibration at an amplitude of 0.3 mm and clamp force of 4500 N. The results indicated that for the pre-heat group, compared to the group without pre-heat, the weld flash was laterally smaller, considerably more rounded, and smoother. In addition, the pre-heat samples did not contain material flakes, or particulate, at the outer edge of the weld bead commonly observed on the conventionally welded samples. The added advantage of vibratory pre-heating it that no additional components beyond the standard vibration welder configuration of FIG. 1 is necessary, reducing equipment cost and allowing for faster cycle times.

Figure 7:
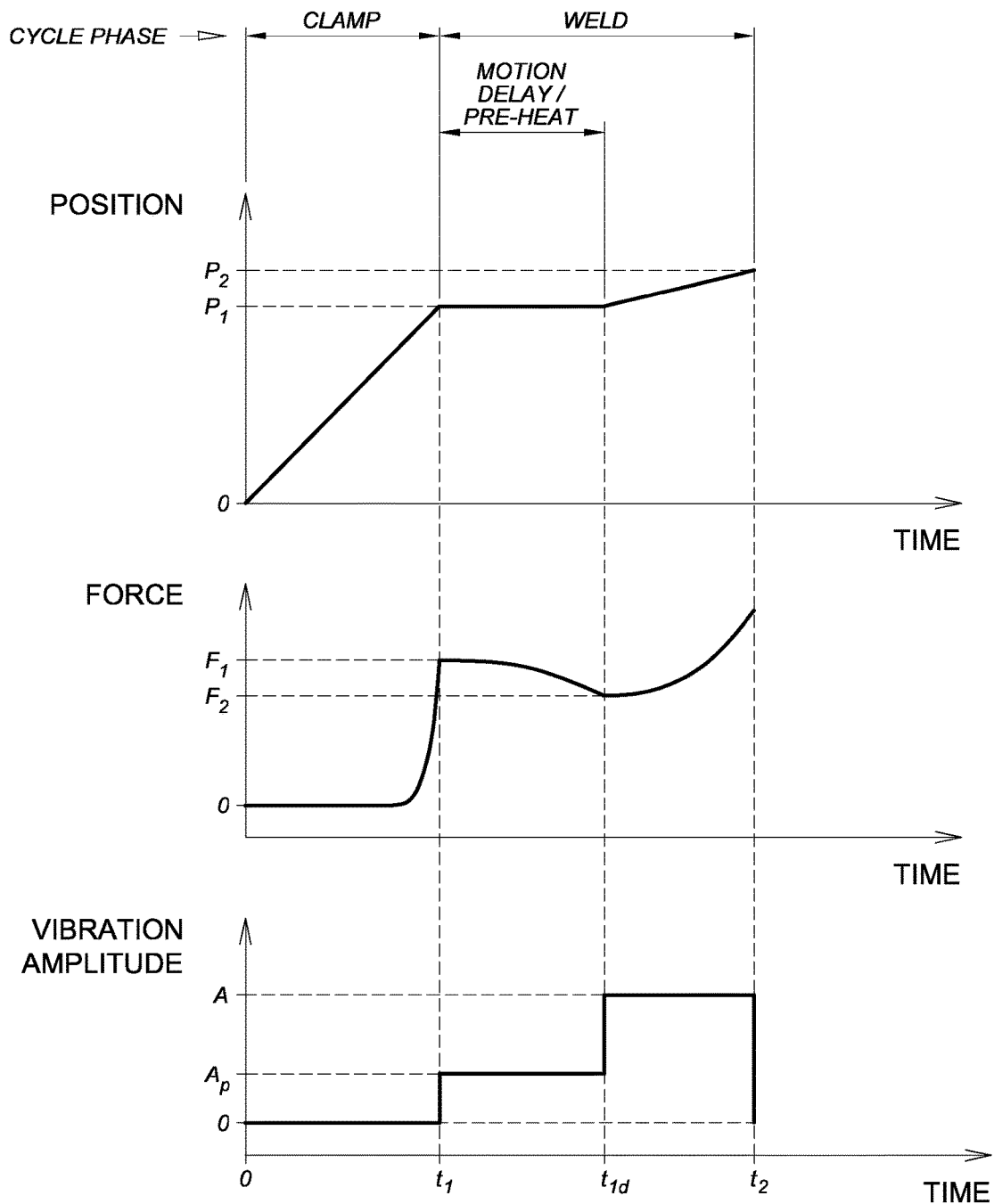
FIG. 7 is a set of graphs consisting of position, force, and vibration amplitude versus time to illustrate the concept combination of delayed motion and pre-heating.

The method of using initially low amplitude vibrations can also be integrated with the aforementioned delayed motion technique. In particular, the vibration amplitude is low, relative to the optimized weld amplitude, during the motion delay phase at the beginning of the weld, resulting in less particulate generation compared to larger amplitudes. This concept is illustrated in FIG. 7, which is the same as the delayed motion example cited in FIG. 3, except for the reduced vibration amplitude Ap during the motion delay stage. With this approach, the pre-heat duration is determined dynamically, in contrast to the fixed time duration in the example of FIG. 6, because the system senses when the force decreases to a predetermined level F2, indicating an increase in part compliance due to material softening. Although the change in vibration amplitude from Ap to A is shown in FIG. 7 to be abrupt, a gradual ramp-up of amplitude can alternatively be employed.

The various aspects of the present disclosure, namely the use of higher frequencies of vibration, the method of controlling pressing action, and the use of low vibration amplitudes to pre-heat the parts can be independently employed to yield improvements in the weld process. They can also be combined to aggregate the benefits arising from each aspect.

What is claimed is:

1. A vibration welding system comprising
   a pair of support members engaging a pair of opposed workpieces,
   a vibrating drive coupled to one of said support members for vibrating that support member and the workpiece engaging that support member,
   an actuator engaging at least one of said support members and controllably forcing said workpieces together,
   a sensor producing an output signal representing the position of at least one of said support members, and
   a controller coupled to said vibrating drive, said actuator and said sensor, said controller receiving said output signal from said sensor and configured to
      supply a signal to said actuator to press said opposed workpieces against each other, and
      supply a signal to said vibrating drive and said actuator to
         initially vibrate at least one of the two workpieces at a first amplitude of vibration while said actuator presses said workpieces together, to pre-heat engaging surfaces of said workpieces while maintaining said workpieces in fixed positions relative to each other, and
         vibrate at least one of the two workpieces at a second amplitude of vibration that is greater than said first amplitude while said actuator presses the two workpieces together to weld the facing surfaces of said workpieces while advancing at least one of said workpieces toward the other workpiece.

2. The vibration welding system of claim 1, wherein the operating vibration frequency is between about 260 Hz and about 400 Hz.

3. The vibration welding system of claim 1, wherein the pressing action is effected by directly controlling, with a control system and at least one sensor, the relative position of the first workpiece to the second workpiece during some phase or the entirety of the weld cycle.

4. The vibration welding system of claim 3, wherein the relative position of the workpieces is maintained immediately after, or some time after, the vibrations are terminated.

5. The vibration welding system of claim 1, which includes an external control device coupled to the control system to produce at least one input signal to said control system to adjust the speed of relative motion between the first workpiece and the second workpiece, the force between the workpieces, or both speed and force on-the-fly based on an algorithm using said input signal.

6. The vibration welding system of claim 1, wherein the speed of collapse between the first workpiece and the second workpiece is independently programmable to be constant or variable during each of the various phases of the weld cycle, including melting and solidification.

7. The vibration welding system of claim 1, wherein the pressing action between the first workpiece and the second workpiece is effected by controlling the speed between the workpieces during some phases of the weld cycle, and controlling the force between the workpieces during other phases of the weld cycle.

8. The vibration welding system of claim 1, wherein said controller and said actuator are configured to advance at least one of said workpieces toward the other workpiece only after the monitored control variable satisfies a predetermined condition that comprises one of:
   a specified force;
   a specified elapsed time;
   a specified power, a specified cumulative power, a specified voltage, a specified current, or a specified cumulative current output from the vibration drive;
   a specified value of a sensed temperature of one or more areas of the workpieces being welded; or
   a specified value of a parameter associated with the actuating means of pressing the workpieces together, including the pressure of a fluid or pneumatic system, or the torque or linear force of an electric actuator.

9. The vibration welding system of claim 1, wherein the amplitude of vibration, during the period when the relative position between the workpieces is maintained while vibrations are active, is less than the amplitude employed after subsequent advancing movement of at least one of said workpieces toward the other workpiece is initiated.

10. A vibration welding method comprising
pressing a pair of workpieces to be welded against each other,
initially vibrating at least one of the two workpieces at a first amplitude of vibration while the two workpieces are pressed together, to pre-heat engaging surfaces of said workpieces while maintaining said workpieces in fixed positions relative to each other, and
vibrating at least one of the two workpieces at a second amplitude of vibration that is greater than said first amplitude while the two workpieces are pressed together to weld the facing surfaces of said workpieces while advancing at least one of said workpieces toward the other workpiece.

11. The vibration welding method of claim 10, wherein the operating vibration frequency is between about 260 Hz and about 400 Hz.

12. A vibration welding method of claim 10, wherein the relative positions of the workpieces are is maintained immediately after, or some time after, the vibrations are terminated.

13. The vibration welding method of claim 10, wherein the speed of relative motion between the first workpiece and the second workpiece, the force between the workpieces, or both speed and force are adjusted on-the-fly based on an algorithm in response to an input signal from an external control device coupled to the control system.

14. The vibration welding method of claim 10, wherein the speed of collapse between the first workpiece and the second workpiece is independently programmable to be constant or variable during each of the various phases of the weld cycle, including melting and solidification.

15. The vibration welding method of claim 10, wherein the pressing action between the first workpiece and the second workpiece is effected by controlling the speed between the workpieces during some phases of the weld cycle, and controlling the force between the workpieces during other phases of the weld cycle.

16. The vibration welding method of claim 10, which includes advancing at least one of said workpieces toward the other workpiece only after the monitored control variable satisfies a predetermined condition that comprises one of:
a specified force;
a specified elapsed time;
a specified power, a specified cumulative power, a specified voltage, a specified current, or a specified cumulative current output from the vibration drive;
a specified value of a sensed temperature of one or more areas of the workpieces being welded; and
a specified value of a parameter associated with the actuating means of pressing the workpieces together, including the pressure of a fluid or pneumatic system, or the torque or linear force of an electric actuator.

17. The vibration welding method of claim 10, wherein the amplitude of vibration, during the period when the relative position between the workpieces is maintained while vibrations are active, is less than the amplitude employed after subsequent advancing movement of at least one of said workpieces toward the other workpiece is initiated.

18. The method of claim 10 which includes monitoring a control variable, and advancing at least one of said workpieces toward the other workpiece only after the monitored control variable satisfies a predetermined condition.

19. The system of claim 1 in which said controller is configured to monitor a control variable, and advance at least one of said workpieces relative to the other workpiece only after the monitored control variable satisfies a predetermined condition.

* * * * *